May 9, 1933.  T. WILFRED  1,908,203
LIGHT PROJECTION DISPLAY
Filed Aug. 6, 1930
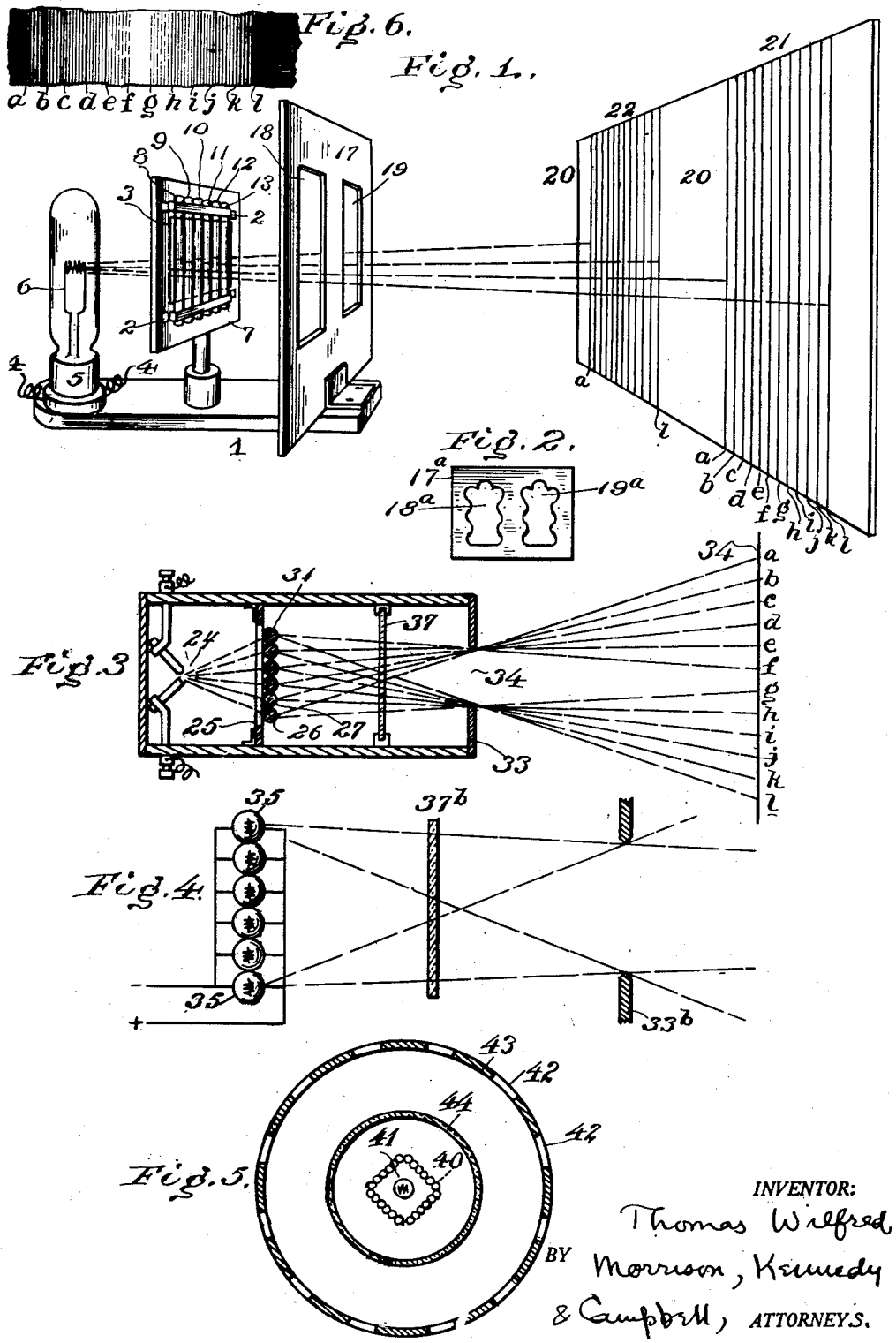
INVENTOR:
Thomas Wilfred
BY Morrison, Kennedy
& Campbell, ATTORNEYS.

Patented May 9, 1933

1,908,203

UNITED STATES PATENT OFFICE

THOMAS WILFRED, OF FOREST HILLS, NEW YORK

LIGHT PROJECTION DISPLAY

Application filed August 6, 1930. Serial No. 473,495.

This invention relates to the art of light projection display, and more particularly to method and apparatus for the projection of effects in light or color on a wall or curtain for exhibition.

The main object of the present invention is to enable the projection upon a suitable surface of effects simulating architectural and other forms, such as columns, the projected effect having repeated elements which diminish in intensity toward the final edge or outline, thereby creating an effective optical illusion of the projected effect having three dimensions, such as the convex roundness of a column or other form.

A further object is to afford a relatively simple projection apparatus adapted to produce effects of the kind set forth.

A further object is to supplement the basic idea and effect by additional combinable features or effects for the purpose of lending greater scope or variety.

The invention may be practically applied for many different purposes, for example for the decoration of the interior or exterior wall and ceiling surfaces of a building or room with projected columns, arches or other designs, these having the advantage over painted or sculptured forms of being instantly interchangeable or removable.

In the accompanying drawing Fig. 1 is a perspective side view in diagram showing the principles of the invention. Fig. 2 shows a modified intercepting screen or mask. Fig. 3 is a diagrammatic top view illustrating the manner in which the light rays are produced and projected to give the desired effects. Fig. 4 is a partial diagrammatic top view of a modification. Fig. 5 is a top view of a modified projector from which images are producible in many directions from the same source. Fig. 6 shows one type of projected effect.

The drawing, showing several embodiments of the apparatus, may be specifically described in detail as follows. Referring first to Fig. 1, upon a base plate 1 is shown mounted a support or socket 5, holding a filamentary lamp 6, constituting the source of light, energized by conductors 4. In front of the light source is a bracket supporting a frame 7 having an opening 3, in front of which is a series of cylindrical glass rods 8, 9, 10, 11, 12 and 13 constituting lenses. These are held by means of straps 2.

On the extreme front of base plate 1 is mounted an opaque wall 17 having a series of, for example two, vertical slits 18 and 19 through which the light rays from lamp 6, after having passed through the cylindrical lenses 8 to 13, can travel to curtain or wall 20.

The cylindrical glass rods, placed vertically in front of the light source each distribute the light from said source over an area having considerable horizontal width. The entire series of such glass rods, placed side by side, will produce a plurality of overlapping areas. I have found that if an opaque screen, having one or more slits, is placed between the rods and the curtain upon which the light is projected, a plurality of images of each slit will appear on the projection curtain, overlapping in such a way as to present to the eye a composite image of each slit, this image composed of a plurality of elements or areas which present the maximum intensity near the middle and diminish in intensity toward the extreme right and left edges. This phenomenon affords an interesting and beautiful effect creating an optical illusion of roundness or of an image or column having three dimensions.

Each rod or cylindrical glass bar is a cylindrical lens, and to prevent aberration each lens may have its side edges opaquely coated. The projected effect from each slit or window is a complete convex column, or may be in some cases, a concave form, in three dimensions. Thus the aperture 18 gives the column 21 and the aperture 19 the column 22. The space on the curtain or wall 20 between the column effects, will usually be black, but is left blank for simplicity of showing, but might have background effects projected upon it, combining with the columns. Fig. 6 shows a column effect so projected, having a fluted appearance, and representing the columns 21 and 22 of Fig. 1.

The slits 18 and 19 may each be rectangular and so narrow that the central area of the wall image, illuminated by the light beams from all the rods, is of the same horizontal width as the distance from each of the successive projected areas to the next, on either side, the image on the screen will give a striking resemblance to a round fluted column of great beauty. Due to the substantial horizontal spread of each of the light beams, a number of such column images can be produced from the same projector by merely having more slits or apertures in the opaque mask or screen interposed between the glass rods and the projection screen. In fact, the entire wall surface of a hall or room can have projected upon it a series of such column or other images. For example, as shown in Fig. 5 a plurality of series of glass rods 40 are placed so as to completely surround the lamp 41, this combination being in turn surrounded by a cylindrical or polygonal mask 43 with a plurality of apertures or slits 42. Varying colors are here producible in the images by means of a cylindrical or polygonal transparent color screen 44. The type of projector shown in Fig. 5 can conveniently be built resembling an ornamental chandelier and suspended from the ceiling.

By the use of masks or partitions having slits of irregular or ornamental shape, for example such as shown in Fig. 2 a multitude of fantastic images can be produced. Also, by using glass rods of different colors or by interposing transparent color screens, between the glass rods and the slitted mask, these images can be colored in any way desired, the colors generally appearing in soft gradations which change in intensity with the various outlines.

In Fig. 2 the partition 17$^a$ has apertures 18$^a$, 19$^a$ of arbitrary shape, varying the projected form but on the same principles.

The preferred way in which a multiple area projection, for instance overlapping projections to afford a column image, is produced, is shown in Fig. 3.

The light source 24, which in this case is shown as an electric arc, passes through six vertical glass rods or cylindrical lenses 26 to 31, mounted on a frame 25. The six individual beams of light 26$^{a-g}$, 27$^{b-h}$, etc., are partially intercepted by slitted partition 33, before passing on to the projection surface 34, and may be colored by a screen 37. The beam of light issuing from glass rod 26 can thus illuminate the surface 34 from point $a$ to point $g$ only, from rod 27 area $b$ to $h$ only, etc., until rod 31 covers area $f$ to $h$. Area $f$ to $g$ thus receives light from all six rods and consequently constitutes a vertical stripe of the brightest area in the projection. Each subsequent field or stripe to either side of area $f$—$g$ receives light from one less rod, or five, and so on, until areas $a$—$b$ and $k$—$l$ at the extreme sides receive light from only one rod and are the darkest areas. This progressive reduction in intensity, being effected from the center outward in both directions, gives a startling illusion simulating the lights and shadows of the roundness of a cylindrical column or other form.

For the decoration of large surfaces, such as the exterior wall of an entire building, or where the distance or great intensity of light is desirable, the single light source and the series of glass rods can be replaced by a series of individual light sources, such as incandescent bulbs or arc lights 35, such an arrangement being shown in Fig. 4. Six individual lamps are shown producing six individual beams of light which are intercepted substantially as above described by slitted screen 33$^b$.

The apertured partition 17, 17$^a$, 33 or 33$^b$ in each case must be so spaced from the row of lenses or lamps that the image stripes will overlap and give progressive decrease of brightness from a middle stripe outward. The relation between the series of beam sources, and the apertures and the receiving curtain is such that the bright stripe or area $f$—$g$ will be of suitable width to carry out the effect desired, as indicated in Figs. 1, 3 and 6.

While the invention has been particularly shown as employed in the production of the effect of vertical columns either straight or with irregular contours, it is clear that the principles could be used for giving the effect of other architectural form, for example horizontal forms, with convex rounding toward the upper and lower edges, or for that matter forms that are spherical or rounded in all directions from a general center, namely by means of a solid bank of lamps or lenses and apertures limited in dimension both horizontally and vertically.

While in each embodiment there has been shown a row or bank of light beam sources, either lenses or lamps, spaced slightly apart, and giving the effect of fluting on the column, the embodiment could be altered by increasing the closeness or continuity of the light sources, or even replacing the series thereof by a continuous source of light such as luminiscent tubes, thus affording the effect of a true cylindrical column or figure without the effect of fluting produced by the spaced sources.

While the partition 17 or 33 or 33$^b$ or 43 has been referred to as preferably opaque with apertures or slits in the nature of windows cut therein to give passage to the light beams, I contemplate an arrangement wherein the partition is composed of a sheet of glass in which case the glass partition as a whole may be coated with a suitable coloring matter, such as dark blue, of transparent character, so as to permit the passage of rays to form a colored background on the distant wall, with however clear spaces left in the places designated for the apertures 18, 19, 34 and 42 respectively, these clear spaces permitting the passage of white or relatively strong light to afford the illusion of described columns, appearing upon a background of the darker color transmitted through the remainder of the partition.

There have thus been described a method and apparatus for projection of effects in light or color embodying the principles and attaining the objects of the present invention. Since many matters of arrangement, combination and detail may be variously modified without departing from the principles it is not intended to limit the invention except so far as set forth in the appended claims.

What is claimed is:

1. Light projection display apparatus comprising a light source, a bank of beam producing lenses in front of the light source, and a partition in front of the bank of lenses and having one or more apertures, a receiving wall, the partition so spaced between the bank of lenses and receiving wall that each aperture passes a series of overlapping beams, thereby giving a progressively graded projected effect with maximum intensity at the middle and minimum at the edges thereof.

2. Apparatus as in claim 1 and wherein the lenses are vertical cylindrical lenses and the apertures are vertical oblong apertures, giving the effect of columns in three dimensions.

3. Apparatus as in claim 1 and wherein the light source is at the center, the lenses are arranged in successive series around all sides of the light source, and the partition surrounds the lenses on all sides and has a large number of apertures directed in various directions from the center.

4. Light projection display apparatus comprising a bank of at least four light beam sources of substantially the same color of illumination, arranged transverse to the direction of projection, a projection receiving surface, and a partition having a fixed relation to the bank of sources and formed with one or more relatively narrow vertical slots and arranged transverse to the direction of projection, in front of the bank of sources; the partition being arranged between the light sources and the receiving surfaces and spaced substantially nearer to the sources than to the receiving surface and each slot having such width as to pass a series of beams from the respective sources, causing them to overlap on the distant receiving surface; thereby giving a progressively graded projected effect of at least seven stripes with maximum intensity near the middle and minimum near the edges thereof, affording the projected effect of a round fluted column.

In testimony whereof, this specification has been duly signed by:

THOMAS WILFRED.